United States Patent
Tokura et al.

(10) Patent No.: US 9,478,935 B2
(45) Date of Patent: Oct. 25, 2016

(54) OPTICAL AMPLIFIER, WAVELENGTH MULTIPLEXING OPTICAL TRANSMISSION SYSTEM, AND PROGRAM

(71) Applicants: Toshiyuki Tokura, Tokyo (JP); Kazuyuki Ishida, Tokyo (JP)

(72) Inventors: Toshiyuki Tokura, Tokyo (JP); Kazuyuki Ishida, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/412,816

(22) PCT Filed: Dec. 5, 2012

(86) PCT No.: PCT/JP2012/081552
§ 371 (c)(1),
(2) Date: Jan. 5, 2015

(87) PCT Pub. No.: WO2014/087505
PCT Pub. Date: Jun. 12, 2014

(65) Prior Publication Data
US 2015/0188286 A1    Jul. 2, 2015

(51) Int. Cl.
*H04J 14/02*  (2006.01)
*H01S 3/00*  (2006.01)
(Continued)

(52) U.S. Cl.
CPC ......... *H01S 3/1312* (2013.01); *H01S 3/06754* (2013.01); *H01S 3/10015* (2013.01); *H01S 3/1301* (2013.01); *H01S 3/1305* (2013.01); *H04B 10/296* (2013.01); *H04J 14/02* (2013.01);
(Continued)

(58) Field of Classification Search
CPC ............ H04B 10/296; H04B 10/2931; H01S 3/1312; H01S 3/09408
USPC .............................. 398/79, 33, 92
See application file for complete search history.

(56) References Cited

U.S. PATENT DOCUMENTS

| 5,268,786 A | 12/1993 | Matsushita et al. |
| 5,374,973 A * | 12/1994 | Maxham ............... H01S 3/1301 359/341.4 |

(Continued)

FOREIGN PATENT DOCUMENTS

| JP | 5 41624 | 2/1993 |
| JP | 5 136499 | 6/1993 |

(Continued)

OTHER PUBLICATIONS

International Search Report Issued Jan. 22, 2013 in PCT/JP12/081552 Filed Dec. 5, 2012.
(Continued)

*Primary Examiner* — Oommen Jacob
(74) *Attorney, Agent, or Firm* — Oblon, McClelland, Maier & Neustadt, L.L.P.

(57) ABSTRACT

When multiplexed signal lights are amplified by optical amplifiers, a value of a monitor signal is compared with a threshold equivalent to a value of the monitor signal when noise indexes of the multiplexed signal lights start increasing. Next, when the value of the monitor signal is equal to or larger than the threshold, that is, when the powers of the multiplexed signal lights are large, a gain constant control is performed to amplify the multiplexed signal lights. Conversely, when the value of the monitor signal is smaller than the threshold, that is, when the powers of the multiplexed signal lights are small, an output constant control is performed to amplify the multiplexed signal lights.

10 Claims, 6 Drawing Sheets

(51) Int. Cl.
    *H01S 3/131*     (2006.01)
    *H01S 3/13*     (2006.01)
    *H04B 10/296*     (2013.01)
    *H01S 3/10*     (2006.01)
    *H01S 3/067*     (2006.01)
    *H01S 3/0941*     (2006.01)

(52) U.S. Cl.
    CPC ........ *H01S 3/09415* (2013.01); *H01S 2301/02* (2013.01); *H01S 2301/04* (2013.01)

(56) References Cited

U.S. PATENT DOCUMENTS

| | | | | |
|---|---|---|---|---|
| 5,546,221 | A * | 8/1996 | Harasawa | H01S 3/094003 359/341.44 |
| 5,822,112 | A | 10/1998 | Itou et al. | |
| 6,055,092 | A | 4/2000 | Sugaya et al. | |
| 6,583,899 | B1 * | 6/2003 | Casanova | H04B 10/077 398/173 |
| 7,145,717 | B2 * | 12/2006 | Nakata | H04B 10/296 359/341.41 |
| 2002/0149841 | A1 * | 10/2002 | Ohtani | H04B 10/0775 359/341.1 |
| 2003/0030893 | A1 * | 2/2003 | Cornelius | H01S 3/06754 359/341.4 |
| 2003/0067671 | A1 * | 4/2003 | Islam | H04B 10/296 359/337 |
| 2004/0032643 | A1 * | 2/2004 | Chimfwembe | H04B 10/0775 359/337 |
| 2004/0136055 | A1 * | 7/2004 | Michie | H01S 3/0675 359/337.11 |
| 2004/0197105 | A1 * | 10/2004 | Khatana | H04B 10/2935 398/173 |
| 2005/0105170 | A1 * | 5/2005 | Shukunami | H01S 3/06754 359/341.41 |
| 2007/0103766 | A1 * | 5/2007 | frriedrich | H04B 10/0777 359/341.1 |
| 2011/0043897 | A1 * | 2/2011 | Akasaka | H01S 3/09408 359/337 |
| 2011/0286085 | A1 | 11/2011 | Sone et al. | |
| 2012/0045212 | A1 | 2/2012 | Takeyama | |
| 2015/0188286 | A1 * | 7/2015 | Tokura | H01S 3/06758 398/79 |

FOREIGN PATENT DOCUMENTS

| | | |
|---|---|---|
| JP | 8 248455 | 9/1996 |
| JP | 2000 349718 | 12/2000 |
| JP | 2003 318831 | 11/2003 |
| JP | 2005 150435 | 6/2005 |

OTHER PUBLICATIONS

Extended European Search Report mailed Jul. 8, 2016 in European Patent Application No. 12889712.1.

* cited by examiner

OPTICAL AMPLIFIER, WAVELENGTH MULTIPLEXING OPTICAL TRANSMISSION SYSTEM, AND PROGRAM

TECHNICAL FIELD

The present disclosure relates to an optical amplifier, a wavelength multiplexing optical transmission system, and a program, and more specifically, to an optical amplifier having multiple signal lights as input lights, a wavelength multiplexing optical transmission system including the optical amplifier, and a program executed by a controller of the optical amplifier.

BACKGROUND ART

Wavelength multiplexing optical transmission systems employ an optical amplifier that collectively amplifies signal lights to compensate attenuations of signal lights through an optical fiber. An example known optical amplifier is an optical amplifier that utilizes erbium-doped optical fiber. This optical amplifier simultaneously inputs a signal light and an excitation light to the erbium-doped optical fiber, thereby amplifying the signal light.

According to optical amplifiers, when the power of input light changes, the wavelength dependency of the gain also changes. Hence, if this type of optical amplifier is applied to a wavelength multiplexing optical transmission system, the gains of signal lights change in accordance with the number of multiplexed signal lights. Therefore, various technologies of maintaining the gains of respective signal lights constant have been proposed (see, for example, Patent Literature 1).

The device disclosed in Patent Literature 1 has two optical amplifiers connected in series, and causes the first-stage optical amplifier to amplify respective input signals so as to maintain constant the ratio of the level of the input light to that of the output light. Next, the second-stage optical amplifier amplifies the respective signal lights so as to maintain constant the level of the input light to that of the output light, and compensates the wavelength dependency of the gain at the first-stage optical amplifier.

CITATION LIST

Patent Literature

Patent Literature 1: Unexamined Japanese Patent Application Kokai Publication No. H08-248455

SUMMARY OF INVENTION

Technical Problem

According to the device disclosed in Patent Literature 1, the respective optical amplifiers perform gain constant control by making constant the ratio of the level of the input light to that of the output light. Hence, when the power of the incident input light to the optical amplifier is small, the intensity of the excitation light utilized for amplification becomes weak. In this case, the population invention of the optical fiber becomes weak, resulting in a reduction of the SN ratio of each signal light. In particular, in the case of a repeaterless transmission system, the amount of incident input light to the optical amplifier may become quite small due to attenuation and the like. Hence, when the number of signal lights subjected to multiplexing is small, the reduction of the SN ratio becomes remarkable, disrupting communication.

In addition, if gain constant control is performed when the power of the input light is small, both the power of the input light and that of the output light become small. In this case, monitoring the signal light becomes difficult, and thus control of amplification of the signal light becomes difficult. In general, monitoring of the signal light is performed by monitoring the intensity of light branched from the signal light. Hence, when the power of the input light is small, the fraction of branched light from the signal light increases, allowing precise monitoring of the signal light. When, however, the fraction of the branched light from the signal light increases, the loss of the signal light increases, and the SN ratio decreases.

The present disclosure has been made in view of the aforementioned circumstances, and it is an objective of the present disclosure, even if the power of input light decreases, to amplify respective multiplexed signal lights without decreasing the SN ratio of each signal light.

Solution to Problem

To accomplish the above objective, an optical amplifier according to the present disclosure has a plurality of multiplexed signal lights of mutually different frequencies as input light, and the optical amplifier includes: a first detector configured to detect a power of the input light; an excitation light outputter configured to output an excitation light to amplify the input light; a second detector configured to detect a power of the amplified input light; and a controller configured to control excitation light outputter so as to, upon determination that the power of the input light is high based on the detection result of the first detector, make a ratio of a detection result by the second detector relative to a detection result by the first detector constant, and configured to control the excitation light outputter so as to, upon determining that the power of the input light is low based on the detection result by the first detector, make the detection result by the second detector substantially constant.

Advantageous Effects of Invention

According to the present disclosure, when it is determined that the power of the input light is small, instead of use of gain constant control to maintain constant the ratio of the power of the input light to the power of the output light obtained by amplifying this input light, control is performed so as to maintain the power of the output light to be equal to or greater than a certain level. Hence, even if the power of the input light decreases, respective multiplexed input lights can be amplified without decreasing the SN ratio of the output light.

DESCRIPTION OF EMBODIMENTS

Figure 1:
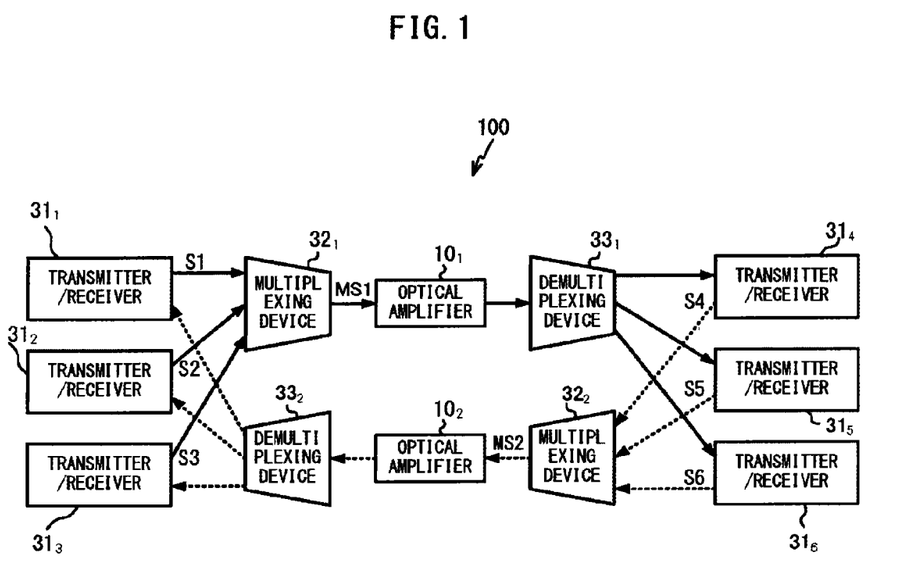
FIG. 1 is a block diagram of a wavelength multiplexing optical transmission system according to an embodiment.

An explanation will be given of an embodiment of the present disclosure with reference to the accompanying drawings. FIG. 1 is a block diagram of a wavelength multiplexing optical transmission system 100 of this embodiment. This wavelength multiplexing optical transmission system 100 is a system that enables information exchange among multiple transmitters/receivers. As illustrated in FIG. 1, the wavelength multiplexing optical transmission system 100 includes multiple transmitters/receivers 31, two multiplexing devices 32, two demultiplexing devices 33, and two optical amplifiers 10.

The transmitter/receiver 31 outputs signal light modulated based on information to be transmitted, thereby transmitting the information. In addition, the transmitter/receiver demodulates received signal light, thereby receiving information. In this embodiment, information is exchanged between the transmitters/receivers $31_1$ to $31_3$ and the transmitters/receivers $31_4$ to $31_6$. In the wavelength multiplexing optical transmission system 100, the transmitters/receivers $31_1$ to $31_6$ output signal lights S1 to S6 have wavelengths that are from one another. Next, the signal lights S1 to S6 are input to the multiplexing devices 32 through optical fibers.

The multiplexing device 32 multiplexes the input multiple signal lights, and outputs the multiplexed signal lights to the optical amplifier 10. In the wavelength multiplexing optical transmission system 100, the multiplexing device $32_1$ multiplexes the signal lights S1 to S3 output by the transmitters/receivers $31_1$ to $31_3$, and generates a multiplexed signal light MS1. In addition, the multiplexing device $32_2$ multiplexes the signal lights S4 to S6 output by the transmitters/receivers $31_4$ to $31_6$, and generates multiplexed signal light MS2. The multiplexed signal lights MS1, MS2 are input to the respective optical amplifiers 10 through optical fibers.

The multiplexed signal lights MS1, MS2 are generated upon multiplexing of the signal lights S1 to S6. Hence, the larger the number of signal lights subjected to multiplexing is, the larger the power of the multiplexed signal lights MS1, MS2 become, and the smaller the number of signal lights subjected to multiplexing is, the smaller the power of the multiplexed signal lights become.

The demultiplexing devices 33 pick up individual signal lights S1 to S6 from the input multiplexed signal lights MS1, MS2, and output the picked-up signals to the respective transmitters/receivers 31.

Figure 2:
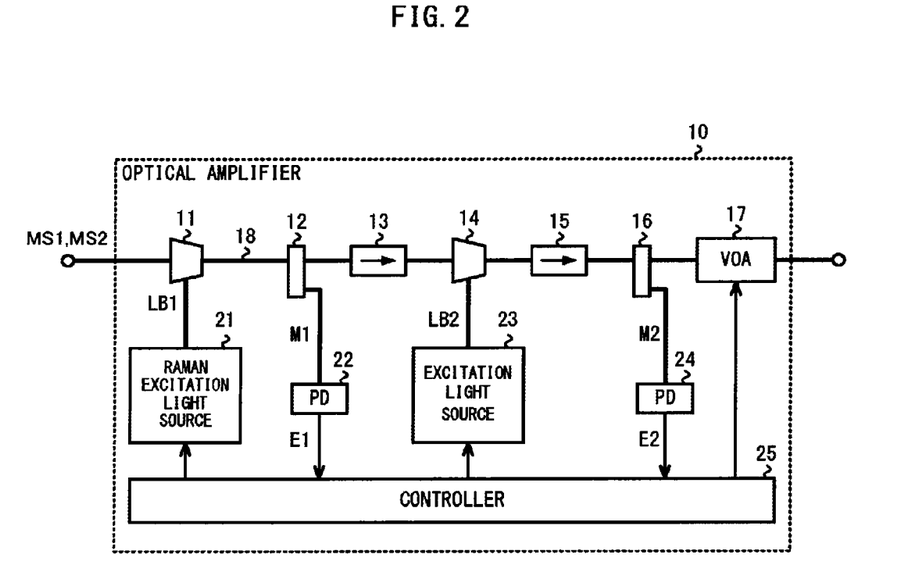
FIG. 2 is a block diagram of an optical amplifier.

FIG. 2 is a block diagram of the optical amplifier 10. This optical amplifier 10 is a device that amplifies the multiplexed signal light MS1, MS2 passing through an erbium-doped optical fiber 18. As illustrated in FIG. 2, the optical amplifier 10 includes a Raman excitation light source 21, photodiodes 22, 24, an excitation light source 23, a variable light attenuator 17, and a controller 25 that comprehensively controls the respective components. In addition, in the optical amplifier 10, the optical fiber 18, multiplexers 11, 14, isolators 13, 15, tap couplers 12, 16, and the variable light attenuator 17 disposed sequentially in this order from an input side to an output side form a channel of the multiplexed signal lights MS1, MS2. In this channel, the isolators 13, 15 suppress a back-flow of the reflective light of the multiplexed signal lights MS1, MS2.

The Raman excitation light source 21 is a semiconductor laser that emits a laser light LB1 having a shorter wavelength than those of the respective signal lights S1 to S6 forming the multiplexed signal lights MS1, MS2. The laser light LB1 emitted from the Raman excitation light source 21 is input to the optical fiber 18 through the multiplexer 11. This laser light LB1 has a travel direction in the optical fiber 18 consistent with the travel directions of the multiplexed signal lights MS1, MS2, and causes a Raman scattering in the optical fiber 18. This results in forward excitation Raman amplification of the multiplexed signal lights MS1, MS2.

The photodiode 22 is an element that outputs a photoelectric conversion signal of a value in accordance with the intensity of input light. In the optical amplifier 10, the tap coupler 12 disposed at the output side of the multiplexer 11 taps some of the multiplexed signal lights MS1, MS2 as a monitor light M1. The photodiode 22 receives the monitor light M1, and outputs to the controller 25 a monitor signal E1 that varies in accordance with the intensity of the received monitor light M1.

The excitation light source 23 is a semiconductor laser that emits a laser light LB2 of 1480 nm or 980 nm wavelength. The laser light LB2 emitted from the excitation light source 23 is input to the optical fiber 18 through the multiplexer 14. This laser light LB2 travels in the same direction as that of the multiplexed signal lights MS1, MS2, and causes an induced emission in the optical fiber 18. Hence, the multiplexed signal lights MS1, MS2 are amplified.

The photodiode 24 is, like the photodiode 22, an element that outputs a photoelectric conversion signal with a value in accordance with the intensity of input light. In the optical amplifier 10, the tap coupler 16 disposed at the output side of the multiplexer 14 taps some of the multiplexed signal lights MS1, MS2 as a monitor light M2. The photodiode 24 receives the monitor light M2, and outputs to the controller 25 a monitor signal E2 in accordance with the intensity of the received monitor light M2.

The variable light attenuator 17 includes, for example, an interference circuit and a heater, and individually adjusts the respective powers of the signal lights S1 to S6 forming the multiplexed signal lights MS1, MS2.

Figure 3:
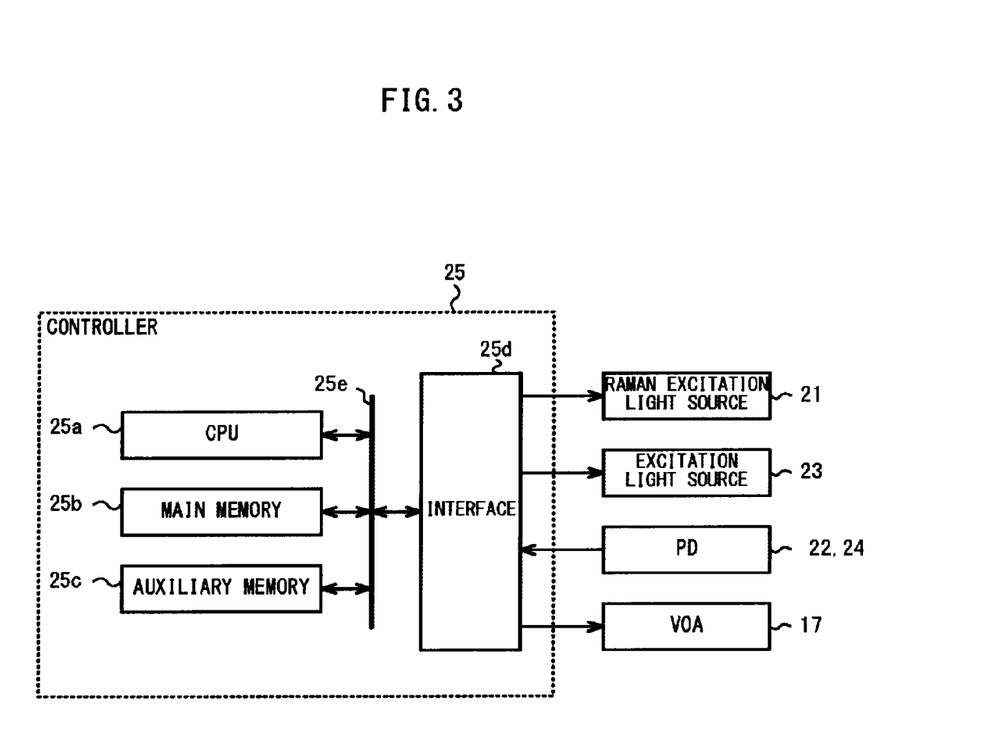
FIG. 3 is a block diagram of a controller.

FIG. 3 is a block diagram of the controller 25. As illustrated in FIG. 3, the controller 25 includes a CPU (Central Processing Unit) 25a, a main memory 25b, an auxiliary memory 25c, an interface 25d, and a system bus 25e connecting these components together.

The main memory 25b includes, for example, a RAM (Random Access Memory), and is utilized as a work area for the CPU 25a.

The auxiliary memory 25c includes a non-volatile memory, such as a ROM (Read Only Memory) or a semiconductor memory. This auxiliary memory 25c stores a program run by the CPU 25a, various parameters, and the like.

The interface 25d is an interface for connecting an external device to the controller 25. The Raman excitation light source 21, the excitation light source 23, the photodiodes 22, 24, and the variable light attenuator 17 are connected to the CPU 25a through the interface 25d.

Next, an explanation will be given of an operation of the optical amplifier 10 employing the above-explained structure. In the optical amplifier 10, when the multiplexed signal lights MS1, MS2 are input, parts of the multiplexed signal lights MS1, MS2 are tapped by the tap couplers 12, 16, and enter the photodiodes 22, 24. Hence, the photodiodes 22, 24 output the monitor signals E1, E2, respectively.

Next, the controller 25 monitors a value P1 of the monitor signal E1, and when the value P1 becomes lower than a reference value, actuates the Raman excitation light source 21 to amplify the multiplexed signals MS1, MS2. Hence, the multiplexer 11 outputs the multiplexed signal light MS1 equal to or larger than a predetermined power.

Next, the controller 25 compares the value P1 of the monitor signal E1 with a threshold Th1 read from the auxiliary memory 25c. Next, when the value P1 of the monitor signal E1 is equal to or larger than the threshold Th1, the excitation light source 23 is controlled in such a way that the ratio of the power of the multiplexed signal lights MS1, MS2 having undergone amplification relative to the power of the pre-amplification multiplexed signal lights MS1, MS2 becomes constant.

Figure 4:
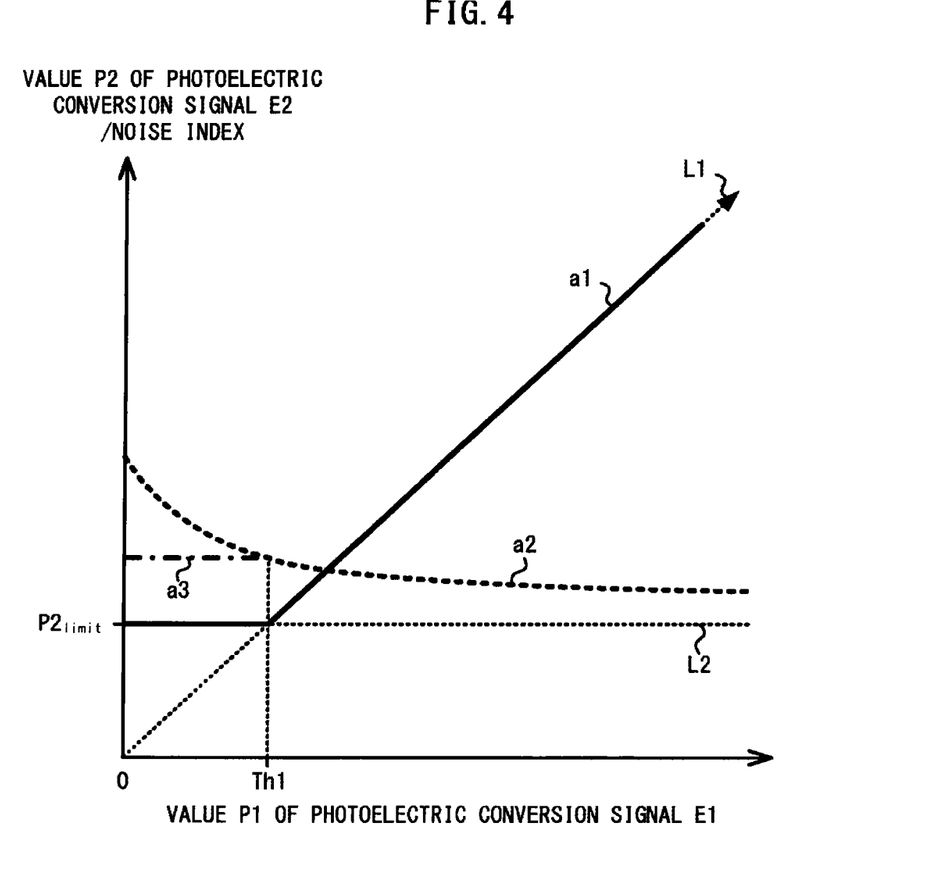
FIG. 4 is a diagram for explaining an operation of the controller.

More specifically, the controller 25 controls the excitation light source 23 in such a way that the ratio (P2/P1) between the value P1 of the monitor signal E1 from the photodiode 22 and a value P2 of the monitor signal E2 from the photodiode 24 becomes constant. Accordingly, as illustrated in FIG. 4, when the value P1 of the monitor signal E1 is equal to or larger than the threshold Th1, as is indicated by a straight line L1 passing through the origin, the value P1 of the monitor signal E1 and the value P2 of the monitor signal E2 satisfy a proportional relationship. In the following explanation, this control will be referred to as a gain constant control for the purpose of simplification of the explanation.

Conversely, when the value P1 of the monitor signal E1 is smaller than the threshold Th1, the power of the multiplexed signal lights MS1, MS2 having undergone amplification are controlled so as to be substantially constant. More specifically, the controller 25 controls the excitation light source 23 in such a way that the value P2 of the monitor signal E2 becomes a constant value $P2_{limit}$. Hence, as illustrated in FIG. 4, when the value P1 of the monitor signal E1 is smaller than the threshold Th1, as is indicated by a straight line L2 parallel to an axis indicating the value P1, the value P2 of the monitor signal E2 converges to the value $P2_{limit}$. In the following explanation, this control will be referred to as an output constant control for the purpose of simplification of the explanation. When the above-explained control is performed, in the optical amplifier 10, the value P1 of the monitor signal E1 and the value P2 of the monitor signal E2 transition along a line a1 that is shown as a thick line in FIG. 4.

In general, when gain constant control is performed, if the power of the multiplexed signal lights MS1, MS2 are decreasing, the value P1 of the monitor signal E1 keeps decreasing. Next, the noise indexes of the amplified multiplexed signal lights MS1, MS2 transition along a line a2 indicated by dashed lines in FIG. 4, and begin to sharply increase at a certain point. Hence, according to the optical amplifier 10, the value P1 of the monitor signal E1 is compared with the threshold Th1, which is equivalent to the value of the monitor signal E1 when the noise indexes of the multiplexed signal lights MS1, MS2 start increasing, and the output constant control is performed when the value P1 of the monitor signal E1 becomes smaller than the threshold Th1. Hence, the power values of the multiplexed signal lights MS1, MS2 are maintained constant. In this case, the noise indexes of the amplified multiplexed signal lights MS1, MS2 do not increase, but rather become constant, even if the power values of the multiplexed signal lights MS1, MS2 before amplification are decreasing, as is indicated by line a3 in FIG. 4.

As is clear from FIG. 1, according to the wavelength multiplexing optical transmission system 100 including the above-explained optical amplifiers 10, when information is transmitted from the transmitters/receivers $31_1$ to $31_3$ to the transmitters/receivers $31_4$ to $31_6$, the signal lights S1 to S3 output by the transmitters/receivers $31_1$ to $31_3$ are multiplexed by the multiplexing device $32_1$, and the multiplexed signal light MS1 is generated. This multiplexed signal light MS1 is amplified by the optical amplifier $10_1$ when transmitted, and reaches the demultiplexing device $33_1$. The demultiplexing device $33_1$ picks up the individual signal lights S1 to S3 from the multiplexed signal light MS1, and transmits the respective signals to the transmitters/receivers $31_4$ to $31_6$.

In addition, when information is transmitted from the transmitters/receivers $31_4$ to $31_6$ to the transmitters/receivers $31_1$ to $31_3$, the signal lights S4 to S6 output by the transmitters/receivers $31_4$ to $31_6$ are multiplexed by the multiplexing device $32_2$, and the multiplexed signal light MS2 is generated. This multiplexed signal light MS2 is amplified by the optical amplifier $10_2$ when transmitted, and reaches the demultiplexing device $33_2$. The demultiplexing device $33_2$ picks up the individual signal lights S4 to S6 from the multiplexed signal light MS2, and transmits the respective signals to the transmitters/receivers $31_1$ to $31_3$.

As explained above, according to this embodiment, when the multiplexed signal lights MS1, MS2 are amplified by the optical amplifiers 10, the value P1 of the monitor signal E1 is compared with the threshold Th1, which is equivalent to the value of the monitor signal E1 when the noise indexes of the multiplexed signal lights MS1, MS2 start increasing. Next, when the value P1 of the monitor signal E1 is equal to or larger than the threshold Th1, that is, when the power of the multiplexed signal lights MS1, MS2 are large, gain constant control is performed to amplify the multiplexed signal lights MS1, MS2. Conversely, when the value P1 of the monitor signal E1 is smaller than the threshold Th1, that is, when the power values of the multiplexed signal lights MS1, MS2 are small, output constant control is performed to amplify the multiplexed signal lights MS1, MS2.

Hence, even if the power values of the multiplexed signal lights MS1, MS2 decrease, increase of the noise characteristics of the multiplexed signal lights MS1, MS2 having undergone amplification are suppressed. As a result, reduction of the SN ratio of the multiplexed signal lights MS1, MS2 can be suppressed.

According to this embodiment, when the power values of the multiplexed signal lights MS1, MS2 are small, output constant control is performed. Output constant control is appropriate if only the power values of the amplified multiplexed signal lights MS1, MS2 are monitored. Accordingly, when output constant control is performed, the power loss of the multiplexed signal lights MS1, MS2 can be suppressed by not tapping the monitor light M1 entering the photodiode 22. As a result, the noise index of the multiplexed signal light MS1 can be reduced.

In this embodiment, the explanation was given of an example case in which the signal lights S1 to S3 from the transmitters/receivers $31_1$ to $31_3$ are multiplexed to generate the multiplexed signal light MS1, and the signal lights S4 to S6 from the transmitters/receivers $31_4$ to $31_6$ are multiplexed to generate the multiplexed signal light MS2. The present disclosure is not limited to this case, and the multiplexed signal lights MS1, MS2 each may also be generated by multiplexing of four or more signal lights.

Figure 5:
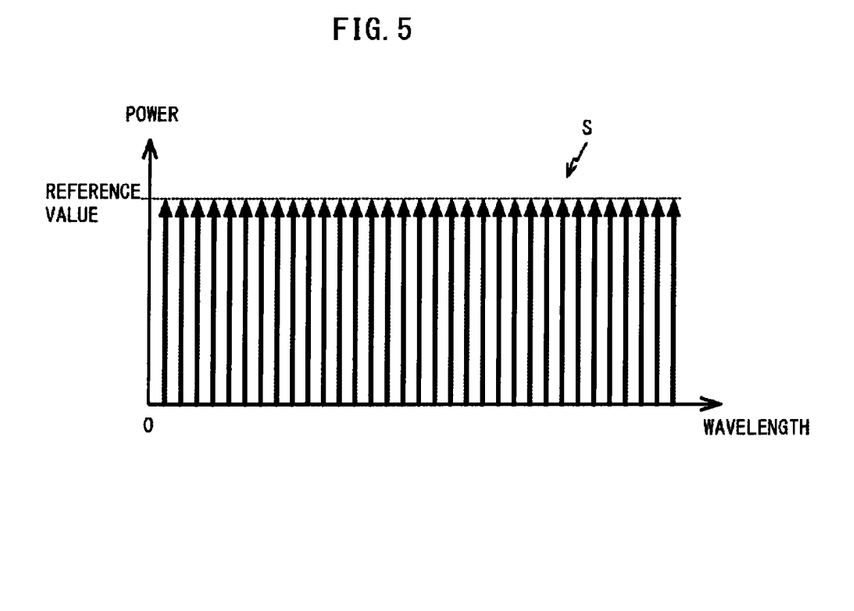
FIG. 5 is a diagram schematically illustrating a multiplexed signal light.
Figure 6:
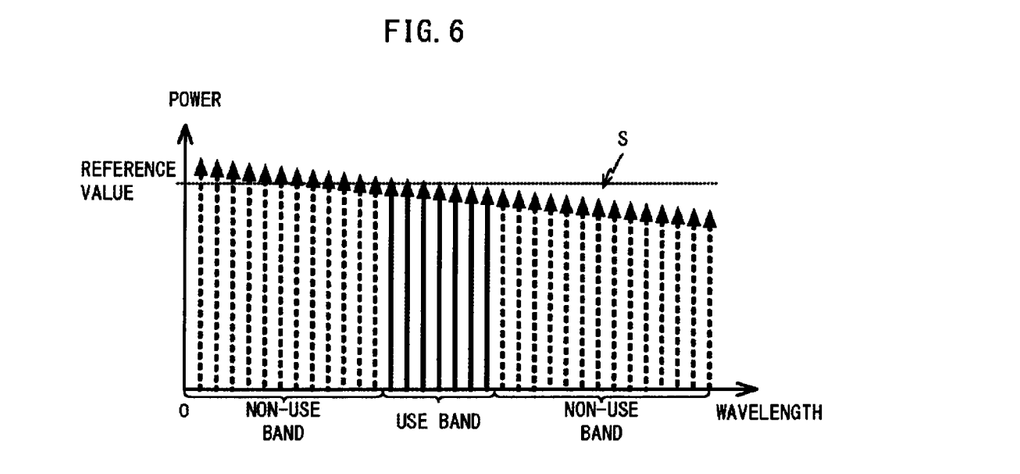
FIG. 6 is a diagram schematically illustrating a multiplexed signal.

FIG. 5 and FIG. 6 are diagrams schematically illustrating a signal light subjected to multiplexing. Each arrow in the figure indicates a signal light, wavelength is indicated by the position along the horizontal axis, and power is indicated by height. According to the optical amplifier 10 of this embodiment, when the value P1 of the monitor signal E1 output by the photodiode 22 is equal to or larger than the threshold Th1, that is, when the power values of the multiplexed signal lights MS1, MS2 are large, the wavelength dependency of the gain becomes flat. Hence, as illustrated in FIG. 5, the amplified multiplexed signal light MS1 is formed by a large number of signal lights S having powers equal to one another. Accordingly, when the power values of the multiplexed signal lights MS1, MS2 are large, all amplification bands of the optical amplifier 10 can be said to be available.

Conversely, when the value P1 of the monitor signal E1 output by the photodiode 22 is smaller than the threshold Th1, that is, when the power values of the multiplexed signal lights MS1, MS2 are small, the wavelength dependency of the gain does not become flat, and as illustrated in FIG. 6, the magnitudes of the signal lights S forming the amplified multiplexed signal lights MS1, MS2 become variable. This is because the SN ratio of the multiplexed signal lights MS1, MS2 becomes small. In this case, a wavelength range containing the signal lights S and slightly different from the reference value must be set as the use band of the optical amplifier 10, and other ranges must be set as non-use bands. In this case, only the signal light S having a wavelength belonging to the use band is utilized for communication.

<<First Modified Example>>

In this embodiment, gain constant control and output constant control are performed based on the result of comparison of the value P1 of the monitor signal E1 with the threshold Th1. Next, under output constant control, as is clear from FIG. 4, the value P2 of the monitor signal E2 output by the photodiode 24 is controlled so as to be the constant value $P2_{limit}$. The present disclosure is not limited to this case, and when the value P1 of the monitor signal E1 is smaller than the threshold Th1, the output by the excitation light source 23 may be controlled so as to be constant.

As explained above, when the gain constant control is performed, if the power values of the multiplexed signal lights MS1, MS2 decrease, the noise characteristics of the multiplexed signal lights MS1, MS2 start sharply increasing at a certain point. Hence, according to this modified example, when the power values of the multiplexed signal lights MS1, MS2 when the noise characteristics start sharply increasing are defined as $P_{limit}$, the output by the excitation light source 23 is always maintained constant so as to prevent the power values of the multiplexed signal lights MS1, MS2 from becoming lower than $P_{limit}$. More specifically, a current supplied to the semiconductor laser of the excitation light source 23 is maintained constant. Hence, even if the power values of the multiplexed signal lights MS1, MS2 before amplification decrease, the power values of the amplified multiplexed signal lights MS1, MS2 are maintained so as to be equal to or larger than $P_{limit}$.

Hence, even if the powers of the multiplexed signal lights MS1, MS2 decrease, increase of the noise characteristics of the multiplexed signal lights MS1, MS2 having undergone amplification can be suppressed. As a result, a reduction of the SN ratio of the multiplexed signal lights MS1, MS2 can be suppressed, thereby enabling a long-distance transmission of the multiplexed signal lights MS1, MS2.

In the present embodiment, the optical amplifier 10 includes the Raman excitation light source 21. Hence, a reduction of the SN ratio of the multiplexed signal lights MS1, MS2 can be suppressed through Raman amplification.

In the present embodiment, the optical amplifier 10 includes the variable light attenuator 17. Hence, when the Raman excitation light source 21 is actuated, the power values of the multiplexed signal lights MS1, MS2 before amplification increase. As a result, even if the power values of the multiplexed signal lights MS1, MS2 having undergone amplification become larger necessity than necessary, such power values of the multiplexed signal lights MS1, MS2 can be attenuated to a desired level.

<<Second Modified Example>>

In the present embodiment, gain constant control and output constant control are performed based on a result of comparison of the value P1 of the monitor signal E1 with the threshold Th1. Next, under gain constant control, using the monitor signals E1, E2 generated based on the monitor lights M1, M2 by tapping from the multiplexed signal lights MS1, MS2, the excitation light source 23 is controlled. The present disclosure is not limited to this case, and gain constant control may be performed based on the power of a signal light of a specific wavelength.

Figure 7:
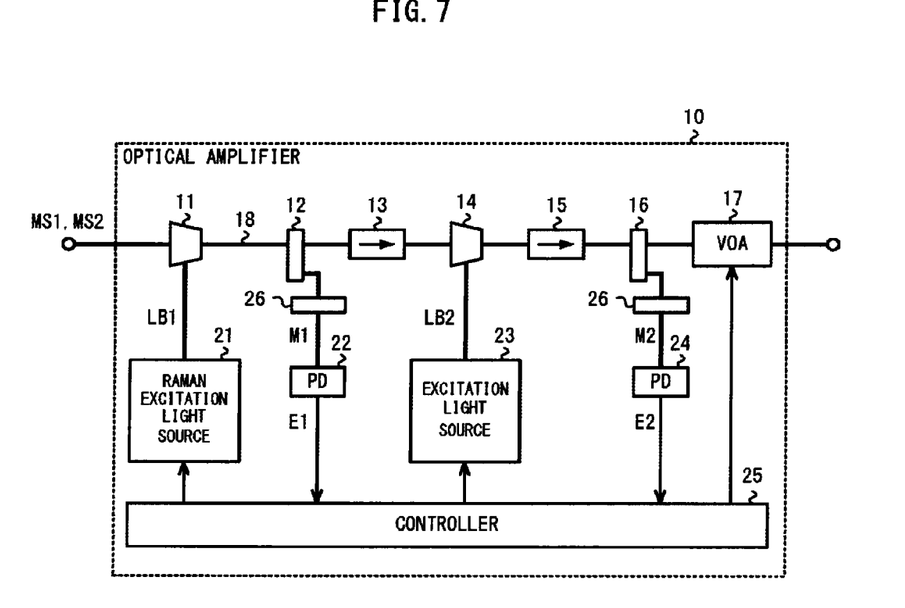
FIG. 7 is a block diagram of an optical amplifier according to a modified example.

More specifically, as illustrated in FIG. 7, filters 26 that allow only a signal light Sn with a specific wavelength to pass therethrough are provided at the respective input sides of the photodiodes 22, 24. Next, the excitation light source 23 is controlled so as to make a ratio between the value P1 of the monitor signal E1 for the signal light Sn and the value P2 of the monitor signal E2 for the signal light Sn constant. Accordingly, performance of control making the gain constant for the signal light Sn of a specific wavelength becomes possible.

The embodiment of the present disclosure and the modified examples thereof were explained above, but the present disclosure is not limited to the aforementioned embodiment and the like. For example, according to the aforementioned embodiment, when gain constant control is performed, the excitation light source 23 is controlled so as to make constant a ratio of the value P1 of the monitor signal E1 and the value P2 of the monitor signal E2. The present disclosure is not limited to this case, and a value corresponding to the power of optical noise may be subtracted from the value P2 of the monitor signal E2 corresponding to the multiplexed signal lights MS1, MS2 having undergone amplification to calculate a correction value P3, and a control may be performed so as to make constant a ratio of the correction value P3 to the value P1 of the monitor signal E1. Accordingly, the adverse effects of errors occurring when gain constant control is used can be reduced.

According to the aforementioned embodiment, when the value P1 of the monitor signal E1 is equal to or larger than the threshold Th1, gain constant control is performed, and when the value P1 is smaller than the threshold Th1, output constant control is performed. The present disclosure is not limited to this case, and the threshold Th1 and a threshold Th2 smaller than the threshold Th1 may be set beforehand. Next, when the value P1 of the monitor signal E1 is equal to or larger than the threshold Th1, a determination is made that the powers of the multiplexed signal lights MS1, MS2 are large, and gain constant control may be performed. When the value P1 of the monitor signal E1 is equal to or smaller than the threshold Th2, a determination is made that the powers of the multiplexed signal lights MS1, MS2 are small, and output constant control may be performed.

When the gain constant control and the output constant control are switched in this way using the threshold Th1 and the threshold Th2 with different values, frequent changes in the control by the controller 25 can be prevented, making the system stable.

In the aforementioned embodiment, based on a comparison result of the value P1 of the monitor signal E1 with the threshold Th1, a determination was made of whether the powers of the multiplexed signal lights MS1, MS2 are large or small. The present disclosure is not limited to this case, and based on a result of comparison of the power of the excitation light emitted from the excitation light source 23 with the predetermined threshold Th3, a determination may be made of whether the powers of the multiplexed signal lights MS1, MS2 are large or small.

Also in this case, the threshold Th3 and a threshold Th4 smaller than the threshold Th3 may be set beforehand, and when the power of the exiting light from the excitation light source 23 is equal to or larger than the threshold Th3, a determination may be made that the multiplexed signal lights MS1, MS2 are large. When the power of the excitation light from the excitation light source 23 is equal to or smaller than the threshold Th4, a determination may be made that the multiplexed signal lights MS1, MS2 are small.

In the aforementioned embodiment, based on the result of comparison of the value P1 of the monitor signal E1 with the threshold Th1, a determination is made of whether the powers of the multiplexed signal lights MS1, MS2 are large or small. The present disclosure is not limited to this case, and based on a comparison result of the current value of the semiconductor laser forming the excitation light source 23 with a predetermined threshold Th5, a determination may be made of whether the powers of the multiplexed signal lights MS1, MS2 are large or small.

In this case, the threshold Th5 and a threshold Th6 smaller than the threshold Th5 are set beforehand, and when the current value of the semiconductor laser forming the excitation light source 23 is equal to or larger than the threshold Th5, the multiplexed signal lights MS1, MS2 may be determined to be large. When the current value of the semiconductor laser forming the excitation light source 23 is equal to or smaller than the threshold Th6, the multiplexed signal lights MS1, MS2 may be determined to be small.

In the optical amplifier of the aforementioned embodiment, respective lower limit values may be set for the value P1 of the monitor signal E1, the power value of the excitation light from the excitation light source 23, and the current value of the semiconductor laser forming the excitation light source 23, and the gain constant control may be performed within a range such that the respective values do not become lower than the lower limit values.

In the aforementioned embodiment, a case was explained in which the wavelength multiplexing optical transmission system 100 includes the six transmitters/receivers 31. The present disclosure is not limited to this structure, and the wavelength multiplexing optical transmission system 100 may include seven or more transmitters/receivers 31. Likewise, the system may include three or more optical amplifiers 10.

In the aforementioned embodiment, a case was explained in which the optical amplifier 10 includes the isolators 13, 15 and the Raman excitation light source 21, but the isolators 13, 15 and the like are not required structural elements of the optical amplifier 10, and the isolators 13, 15, and the Raman excitation light source 21 may be omitted from the optical amplifier 10.

In the aforementioned embodiment, the laser light LB2 emitted from the excitation light source 23 is made to travel in the same direction as that of the multiplexed signal lights MS1, MS2 in the optical fiber 18, thereby performing forward amplification to amplify the multiplexed signal lights MS1, MS2. The present disclosure is not limited to this case, and the laser light LB2 emitted from the excitation light source 23 may be made to travel in the opposite direction to that of the multiplexed signal lights MS1, MS2, thereby performing so-called backward excitation amplification to amplify the multiplexed signal lights MS1, MS2.

The controller 25 for the optical amplifiers 10 of the aforementioned embodiment can be realized by single-purpose hardware or by a normal computer system.

In the aforementioned embodiment, the program is stored in the auxiliary memory 25c of the controller 25, but such a program stored in a computer-readable recording medium, such as a flexible disk, a CD-ROM (Compact Disk Read-Only Memory), a DVD (Digital Versatile Disk), or an MO (Magneto-Optical disk), may be distributed, and installed in a computer to configure a controller that executes the aforementioned processes.

The present disclosure permits various embodiments and modified examples without departing from the broadest scope and spirit of the present disclosure. The aforementioned embodiment is described to explain the present disclosure, and is not intended to limit the scope of the present disclosure. That is, the scope of the present disclosure should be defined by the appended claims rather than the embodiment. Various modifications made within the claims of the invention and within the meaning of an equivalent of the claims are to be regarded to be in the scope of the invention.

INDUSTRIAL APPLICABILITY

The optical amplifier of the present disclosure and the program thereof are suitable for amplification of a signal light. The wavelength optical transmission system of the present disclosure is suitable for information exchange.

REFERENCE NUMERAL LIST

10 Optical amplifier
11, 14 Multiplexer
12, 16 Tap coupler
13, 15 Isolator
17 Variable light attenuator
18 Optical fiber
21 Raman excitation light source
22, 24 Photodiode
23 Excitation light source
25 Controller
25a CPU
25b Main memory
25c Auxiliary memory
25d Interface
25e System bus
26 Filter
31 Transmitter/receiver
32 Multiplexing device
33 Demultiplexing device
100 Wavelength multiplexing optical transmission system
E1, E2 Monitor signal
LB1, LB2 Laser light
M1, M2 Monitor light
MS1, MS2 Multiplexed signal light
S, Sn, S1 to S63 Signal light
a1, a2, a3 Line

The invention claimed is:
1. An optical amplifier including a plurality of multiplexed signal lights of mutually different frequencies as input light, the optical amplifier comprising:
    a first detector configured to detect a power of the input light;
    an excitation light outputter configured to output an excitation light to amplify the input light;

a second detector configured to detect the power of the
   amplified input light;
a third detector configured to detect a power of the
   excitation light; and
a controller configured to
determine that the power of the input light is large upon
   the power of the excitation light detected by the third
   detector being greater than or equal to a first threshold,
determine that the power of the input light is small upon
   the power of the excitation light detected by the third
   detector being smaller than or equal to a second threshold smaller than the first threshold,
control the excitation light outputter so as to, upon determination that the power of the input light is large, make
   a ratio of a detection result by the second detector
   relative to a detection result by the first detector constant, and
control the excitation light outputter so as to, upon determining that the power of the input light is small, make
   the detection result by the second detector substantially
   constant.

2. An optical amplifier including a plurality of multiplexed signal lights of mutually different frequencies as input light, the optical amplifier comprising:
a first detector configured to detect a power of the input light;
an excitation light outputter including a semiconductor laser and configured to output an excitation light to amplify the input light;
a second detector configured to detect the power of the amplified input light; and
a controller configured to
determine that the power of the input light is large upon a current supplied to the semiconductor laser being greater than or equal to a first threshold value,
determine that the power of the input light is small upon the current supplied to the semiconductor laser being less than or equal to a second threshold value smaller than the first threshold value,
control the excitation light outputter so as to, upon determination that the power of the input light is large, make a ratio of a detection result by the second detector relative to a detection result by the first detector constant, and
control the excitation light outputter so as to, upon determining that the power of the input light is small, make the detection result by the second detector substantially constant.

3. The optical amplifier according to claim 1, wherein, upon determining that the power of the input light is small based on the detection result by the first detector, the controller amplifies input light including a wavelength of a set range.

4. The optical amplifier according to claim 1, further comprising an adjuster configured to adjust a power of the amplified input light.

5. A wavelength multiplexing optical transmission system comprising:
a transmitter device configured to output signal light modulated based on transmission information;
a receiver device configured to receive the signal light from the transmitter device; and
an optical amplifier according to claim 1 configured to amplify the signal light output by the transmitter device and to output the amplified signal light to the receiver device.

6. A computer-readable non-transitory recording medium that has stored a program that causes the control device for the optical amplifier according to claim 1 to execute processes of:
controlling the excitation light outputter so as to, upon determination that a power of the input light is based on the detection result of the first detector, make constant a ratio of a detection result by the second detector relative to a detection result of the first detector; and
controlling the excitation light outputter so as to, upon determination that the power of the incident light is low based on the detection result of the first detector, make the detection result by the second detector substantially constant;
upon the power of the excitation light detected by the third detector being greater than or equal to a first threshold, determining that the power of the input light is large; and
upon the power of the excitation light detected by the third detector being smaller than or equal to a second threshold smaller than the first threshold, determining that the power of the input light is small.

7. The optical amplifier according to claim 2, wherein, upon determining that the power of the input light is small based on the detection result by the first detector, the controller amplifies input light including a wavelength of a set range.

8. The optical amplifier according to claims 2, further comprising an adjuster configured to adjust a power of the amplified input light.

9. A wavelength multiplexing optical transmission system comprising:
a transmitter device configured to output signal light modulated based on transmission information;
a receiver device configured to receive the signal light from the transmitter device; and
an optical amplifier according to Claim 2 configured to amplify the signal light output by the transmitter device and to output the amplified signal light to the receiver device.

10. A computer-readable non-transitory recording medium that has stored a program that causes the control device for the optical amplifier according to claim 2 to execute processes of:
controlling the excitation light outputter so as to, upon determination that a power of the input light is based on the detection result of the first detector, make constant a ratio of a detection result by the second detector relative to a detection result of the first detector; and
controlling the excitation light outputter so as to, upon determination that the power of the incident light is low based on the detection result of the first detector, make the detection result by the second detector substantially constant;
upon a current supplied to the semiconductor laser being greater than or equal to a first threshold value, determining that the power of the input light is high; and
upon the current supplied to the semiconductor laser being less than or equal to a second threshold value smaller than the first threshold value, determining that the power of the input light is low.

* * * * *